United States Patent
Sokolov et al.

(10) Patent No.: US 9,477,833 B2
(45) Date of Patent: Oct. 25, 2016

(54) SYSTEMS AND METHODS FOR UPDATING POSSESSION FACTOR CREDENTIALS

(71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/492,777

(22) Filed: Sep. 22, 2014

(65) Prior Publication Data

US 2016/0085962 A1   Mar. 24, 2016

(51) Int. Cl.
| G06F 21/00 | (2013.01) |
| G06F 21/45 | (2013.01) |
| G06F 21/31 | (2013.01) |
| G06F 21/34 | (2013.01) |
| G06F 21/64 | (2013.01) |
| H04L 29/06 | (2006.01) |

(52) U.S. Cl.
CPC ............... *G06F 21/45* (2013.01); *G06F 21/31* (2013.01); *G06F 21/34* (2013.01); *G06F 21/64* (2013.01); *H04L 63/10* (2013.01)

(58) Field of Classification Search
CPC .... G06F 21/31; G06F 21/6236; G06F 21/64; G06F 2221/2101; G06F 2221/2107; G06F 2221/2115; G06F 2221/2151; G06F 21/45; G06F 21/34; H04L 63/0435; H04L 63/10; H04L 63/08; H04L 63/126; H04L 63/0442; H04L 63/0823; H04L 63/083; H04L 63/0853; H04L 63/0861
See application file for complete search history.

(56) References Cited

U.S. PATENT DOCUMENTS

| 5,510,777 | A  | * | 4/1996  | Pilc et al. ..................... 340/5.27 |
| 6,401,206 | B1 | * | 6/2002  | Khan .................... H04L 9/3231 713/176 |
| 6,983,377 | B1 | * | 1/2006  | Beesley et al. ................. 726/12 |
| 2005/0010777 | A1 |  | 1/2005  | Gantman et al. |
| 2006/0143462 | A1 | * | 6/2006  | Jacobs .......................... 713/181 |
| 2007/0022196 | A1 |  | 1/2007  | Agrawal |
| 2009/0132813 | A1 | * | 5/2009  | Schibuk ....................... 713/158 |
| 2010/0281252 | A1 | * | 11/2010 | Steeves et al. ............... 713/155 |

(Continued)

OTHER PUBLICATIONS

"SEP", https://access.va.gov/accessva/?appld=sep, as accessed Aug. 5, 2014, Identity & Access Management (IAM), U.S. Department of Veterans Affairs, (On or before Aug. 4, 2014).

(Continued)

*Primary Examiner* — Don Zhao
(74) *Attorney, Agent, or Firm* — ALG Intellectual Property, LLC (57) ABSTRACT

The disclosed computer-implemented method for updating possession factor credentials may include (1) detecting a request from a user of a service to designate a new object to be used by the service as a possession factor credential in place of a previously designated object, (2) prior to allowing the user to designate the new object, authenticating the user by proofing the identity of the user to verify that an alleged identity of the user is the actual identity of the user and verifying that the proofed identity of the user had possession of the previously designated object, and (3) in response to verifying that the proofed identity of the user had possession of the previously designated object, designating the new object as the possession factor credential. Various other methods, systems, and computer-readable media are also disclosed.

20 Claims, 7 Drawing Sheets

(56) References Cited

U.S. PATENT DOCUMENTS

| | | | |
|---|---|---|---|
| 2013/0019295 A1* | 1/2013 | Park | H04L 9/3213 726/7 |
| 2013/0054433 A1* | 2/2013 | Giard et al. | 705/34 |
| 2013/0055367 A1* | 2/2013 | Kshirsagar et al. | 726/6 |
| 2013/0179952 A1 | 7/2013 | O'Donnell et al. | |
| 2015/0058931 A1* | 2/2015 | Miu et al. | 726/3 |
| 2015/0058950 A1* | 2/2015 | Miu | 726/7 |
| 2015/0059003 A1* | 2/2015 | Bouse | 726/28 |
| 2015/0082390 A1* | 3/2015 | Flink | H04L 63/0861 726/4 |
| 2015/0128240 A1* | 5/2015 | Richards | H04L 63/0861 726/7 |
| 2015/0172463 A1* | 6/2015 | Quast et al. | |

OTHER PUBLICATIONS

"Common issues with 2-Step Verification", https://support.google.com/accounts/answer/185834?hl=en, as accessed Aug. 5, 2014, Google, (May 26, 2013).

"Multi-factor authentication", http://en.wikipedia.org/wiki/Multi-factor_authentication, as accessed Aug. 5, 2014, Wikipedia, (Oct. 1, 2010).

Masover@Berkeley.Edu, "Understanding and Using Social and SAML Identities—Glossary", https://spaces.internet2.edu/display/socialid/Glossary, as accessed Aug. 5, 2015, (Sep. 19, 2011).

"Identity Proofing—An Introduction", http://unissant.com/identity-proofing-an-introduction/, as accessed Aug. 5, 2014, Unissant, Inc., (1999).

\* cited by examiner

Financial Record
440

Name: John Doe
Telephone Number: 555-854-4555
Balance: $4,323.30

| Account Name | XYZ Checking Account |
|---|---|
| Account Number | 123321222 |
| Prior Day Balance | 4,523.22 |
| Current Balance | 3,443.21 |
| Available Balace | 3,200.20 |

Reference to Previously Designated Object
122

Telephone Number: 555-854-4555

SYSTEMS AND METHODS FOR UPDATING POSSESSION FACTOR CREDENTIALS

BACKGROUND

Many services use multi-factor authentication to control who may access online user accounts. According to multi-factor authentication, a service requests that users present two (or more) different forms of authentication to establish an identity that is authorized to access their corresponding accounts. For example, the service may request for a user to present both a knowledge factor (e.g., knowledge of a previously designated password) and a possession factor (e.g., access to a previously designated object that the user possesses).

Because users may forget the knowledge factor or lose access to the possession factor, online services have developed methods for allowing users to update these factors. In general, the traditional protocol for updating a lost possession factor is the same as the protocol for updating a forgotten knowledge factor. Specifically, the protocol allows users to update the factor if they successfully answer security questions. Unfortunately, this traditional protocol allows users to forgo presenting a possession factor (i.e., possession of the object) by, instead, presenting a knowledge factor (i.e., answers to security questions). Users may thereby circumvent the possession factor, which essentially negates the security added by using a possession factor mechanism. Accordingly, the instant disclosure identifies a need for improved systems and methods for updating possession factor authentication credentials.

SUMMARY

As will be described in greater detail below, the instant disclosure describes various systems and methods for securely enabling users to update possession factor credentials updating possession factor credentials by, for example, identity proofing a user attempting to update a possession factor credential and verifying that the proofed identity had access to an object that was previously designated as the possession factor credential. In one example, a computer-implemented method for updating possession factor credentials may include (1) detecting a request from a user of a service to designate a new object to be used by the service as a possession factor credential in place of a previously designated object, (2) prior to allowing the user to designate the new object, authenticating the user by proofing the identity of the user to verify that an alleged identity of the user is the actual identity of the user and verifying that the proofed identity of the user had possession of the previously designated object, and (3) in response to verifying that the proofed identity of the user had possession of the previously designated object, designating the new object as the possession factor credential.

In some examples, detecting the request from the user to designate the new object may include detecting that the user does not have access to the previously designated object. In one embodiment, the previously designated object and/or the new object may include (1) a phone, (2) a physical token received from the service, and/or (3) a soft token received from the service. In some examples, proofing the identity of the user may include (1) submitting, to the user, questions relating to the identity of the user and (2) determining that answers provided by the user, in response to the questions, correspond to the actual identity.

In one embodiment, the previously designated object may include an object that the user already possessed at the time the object was designated as the possession factor credential. In this embodiment, verifying that the proofed identity of the user had possession of the previously designated object may include (1) retrieving a record associated with the user and (2) identifying a reference in the record to the previously designated object. In one example, the record that references the previously designated object may include (1) a credit report, (2) a tax return, (3) a loan application, and/or (4) a phone directory. In some examples, verifying that the proofed identity of the user had possession of the previously designated object may include (1) identifying a third party associated with the user and (2) querying the third party for information relating to whether the user had possession of the previously designated object.

In one embodiment, the previously designated object may include a token issued to the user by the service. In this embodiment, verifying that the proofed identity of the user had possession of the previously designated object may include (1) identifying a physical location and/or object where the token was sent and (2) determining that the user had possession of the physical location and/or object where the token was sent.

In some examples, determining that the user had possession of the physical location and/or object where the token was sent may include (1) retrieving a record associated with the user and (2) identifying a reference in the record to the physical location and/or object where the token was sent. In one embodiment, the record that references the physical location and/or object where the token was sent may include (1) a credit report, (2) a tax return, (3) a loan application, and/or (4) a phone directory.

In some examples, determining that the user had possession of the physical location and/or object where the token was sent may include (1) identifying a third party associated with the user and (2) querying the third party for information relating to whether the user had possession of the physical location and/or object where the token was sent. In a further embodiment, the computer-implemented method may include (1) identifying an attempt by the user to log into a user account provided by the service, (2) determining that the user has possession of the new object, and (3) allowing the user to log into the user account provided by the service based, at least in part, on determining that the user has possession of the new object.

In one embodiment, a system for implementing the above-described method may include (1) a detection module, stored in memory, that detects a request from a user of a service to designate a new object to be used by the service as a possession factor credential in place of a previously designated object, (2) a verification module, stored in memory, that, prior to allowing the user to designate the new object, authenticates the user by proofing the identity of the user to verify that an alleged identity of the user is the actual identity of the user and verifying that the proofed identity of the user had possession of the previously designated object, (3) a designation module, stored in memory, that, in response to the verification module verifying that the proofed identity of the user had possession of the previously designated object, designates the new object as the possession factor credential, and (4) at least one physical processor configured to execute the detection module, the verification module, and the designation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a request from a user of a service to designate a new object to be used by the service as a possession factor credential in place of a previously designated object, (2) prior to allowing the user to designate the new object, authenticate the user by proofing the identity of the user to verify that an alleged identity of the user is the actual identity of the user and verifying that the proofed identity of the user had possession of the previously designated object, and (3) in response to verifying that the proofed identity of the user had possession of the previously designated object, designate the new object as the possession factor credential.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for updating possession factor credentials. As will be explained in greater detail below, the instant disclosure may enable online services to determine whether attempts by users to update possession factor credentials are legitimate (e.g., the identity of the user corresponds to the identity that initially created the account and is thereby authorized to access and make changes to the account) or fraudulent (e.g., the identity of the user does not correspond to the identity that initially created the account and is thereby unauthorized to access and make changes to the account). The disclosed systems and methods may thereby close a loophole that allowed users to update possession factor credentials using only a weak identity proofing mechanism, without the users also demonstrating possession of the previously-designated possession factor credential.

Figure 1:
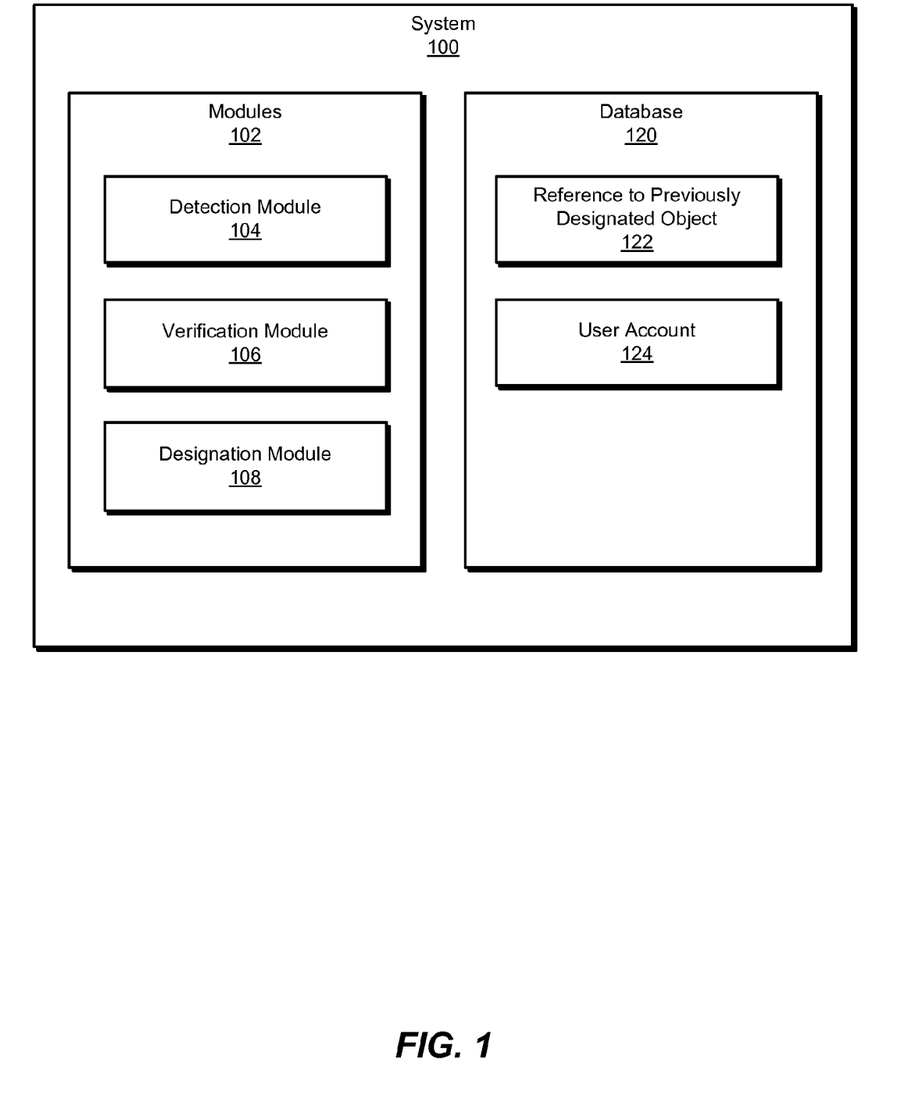
FIG. 1 is a block diagram of an exemplary system for updating possession factor credentials.
Figure 2:
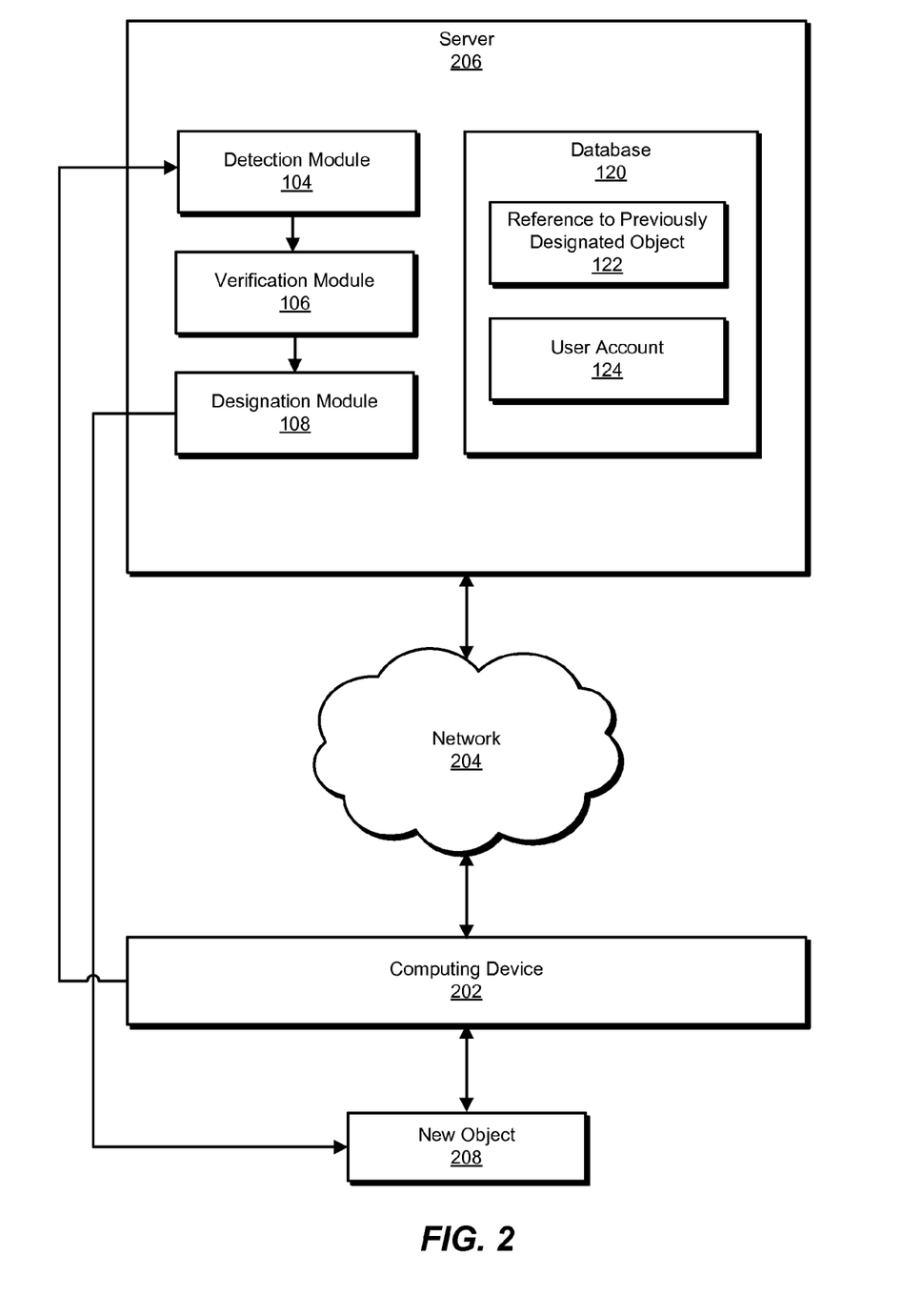
FIG. 2 is a block diagram of an additional exemplary system for updating possession factor credentials.

The following will provide, with reference to FIGS. 1-2, detailed descriptions of exemplary systems for updating possession factor credentials. Detailed descriptions of corresponding computer-implemented methods will also be provided in connection with FIG. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for updating possession factor credentials. As illustrated in this figure, exemplary system 100 may include one or more modules 102 for performing one or more tasks. For example, and as will be explained in greater detail below, exemplary system 100 may also include a detection module 104 that may detect a request from a user of a service to designate a new object to be used by the service as a possession factor credential in place of a previously designated object. Exemplary system 100 may additionally include a verification module 106 that may, prior to allowing the user to designate the new object, authenticate the user by (1) proofing the identity of the user to verify that an alleged identity of the user is the actual identity of the user and (2) verifying that the proofed identity of the user had possession of the previously designated object. Exemplary system 100 may also include a designation module 108 that may, in response to verification module 106 verifying that the proofed identity of the user had possession of the previously designated object, designate the new object as the possession factor credential. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a reference to a previously designated object, such as a reference to previously designated object 122, and/or a user account, such as a user account 124, as discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. In some examples, server 206 may function as part of an online service that authenticates users attempting to access user accounts maintained by the online service before allowing the access.

In one embodiment, one or more of modules 102 from FIG. 1 may, when executed by at least one processor of computing device 202 and/or server 206, enable computing device 202 and/or server 206 to update possession factor credentials. For example, and as will be described in greater detail below, detection module 104 may detect a request from a user of a service to designate a new object 208 to be used by the service as a possession factor credential in place of a previously designated object. Verification module 106 may authenticate the user by proofing the identity of the user to verify that an alleged identity of the user is the actual identity of the user and verifying that the proofed identity of the user had possession of the previously designated object. Designation module 108 may designate new object 208 as the possession factor credential.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of reading computer-readable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
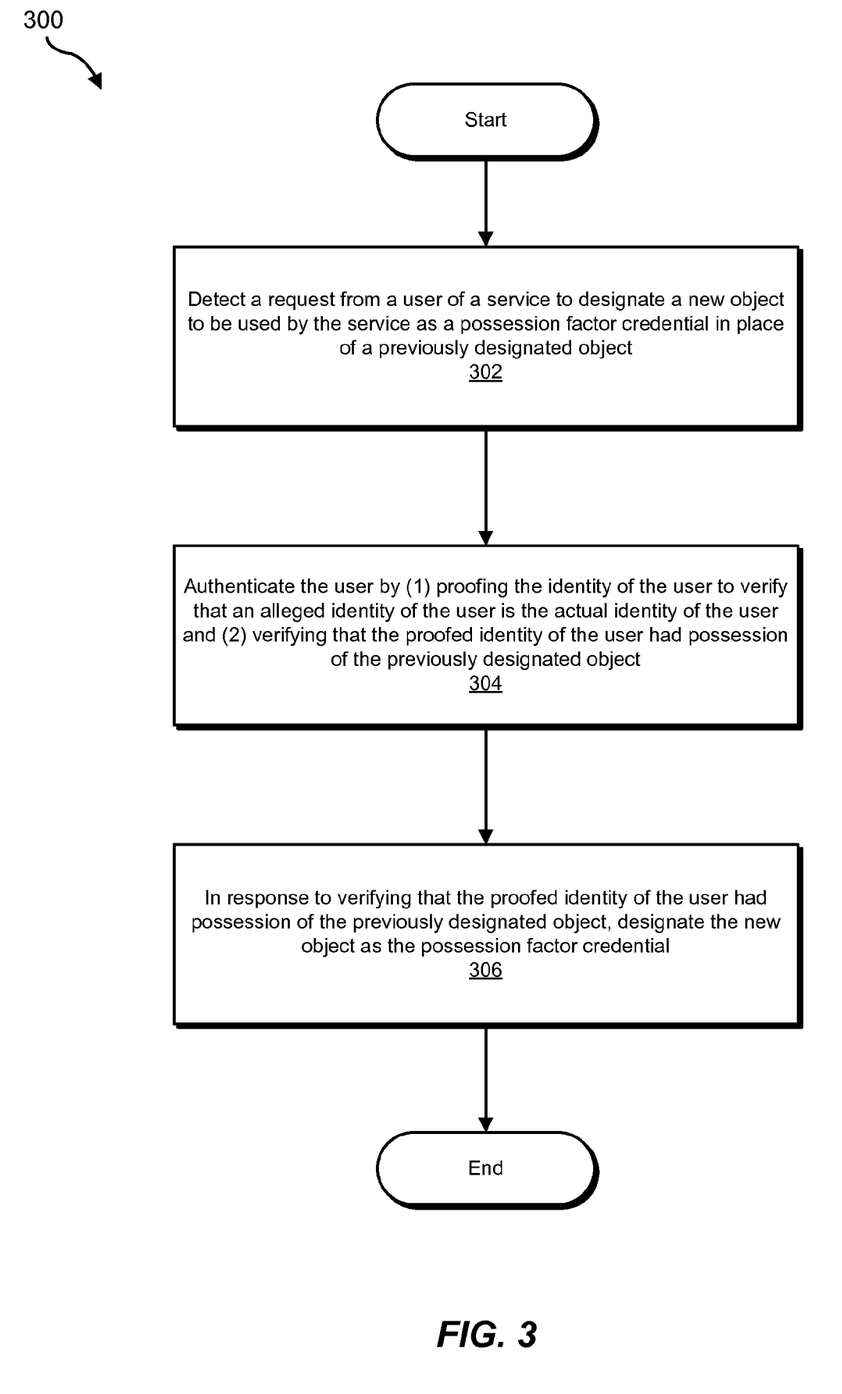
FIG. 3 is a flow diagram of an exemplary method for updating possession factor credentials.

FIG. 3 is a flow diagram of an exemplary computer-implemented method 300 for updating possession factor credentials. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect a request from a user of a service to designate a new object to be used by the service as a possession factor credential in place of a previously designated object. For example, detection module 104 may, as part of server 206 in FIG. 2, detect a request from a user 410 in FIG. 4 (as discussed further below) of a service to designate new object 208 to be used by the service as a possession factor credential in place of a previously designated object.

As used herein, the term "possession factor credential" generally refers to an object that a user undergoing multi-factor authentication demonstrates having in his/her possession. As used herein, the term "multi-factor authentication" generally refers to any type or form of process, procedure, and/or event that authenticates individuals using a combination of at least two different factors. These factors may include something that the user knows (such as a password or a social security number) and/or something that the user possesses (i.e., a possession factor credential). Examples of possession factor credentials may include any object that a user may demonstrate possession of, such as a phone, a physical token received from a service, a soft token received from a service, a debit card, etc.

In some examples, services may use multi-factor authentication to authenticate users before allowing users to access user accounts. In these examples, a user may designate an object that he/she already owns to be used, by the service, as a possession factor credential. For example, a service may prompt a user, such as user 410 illustrated in FIG. 4, to designate a phone number of a phone that the user possesses, such as a cellular phone 430, to be used for future authentication. In this example, the service may subsequently authenticate the user by sending a code to the designated phone number via, e.g., a SHORT MESSAGE SERVICE message or an automated voice call. The user may then demonstrate possession of the phone by submitting the code, upon receiving the code via the phone, to the service.

Figure 4:
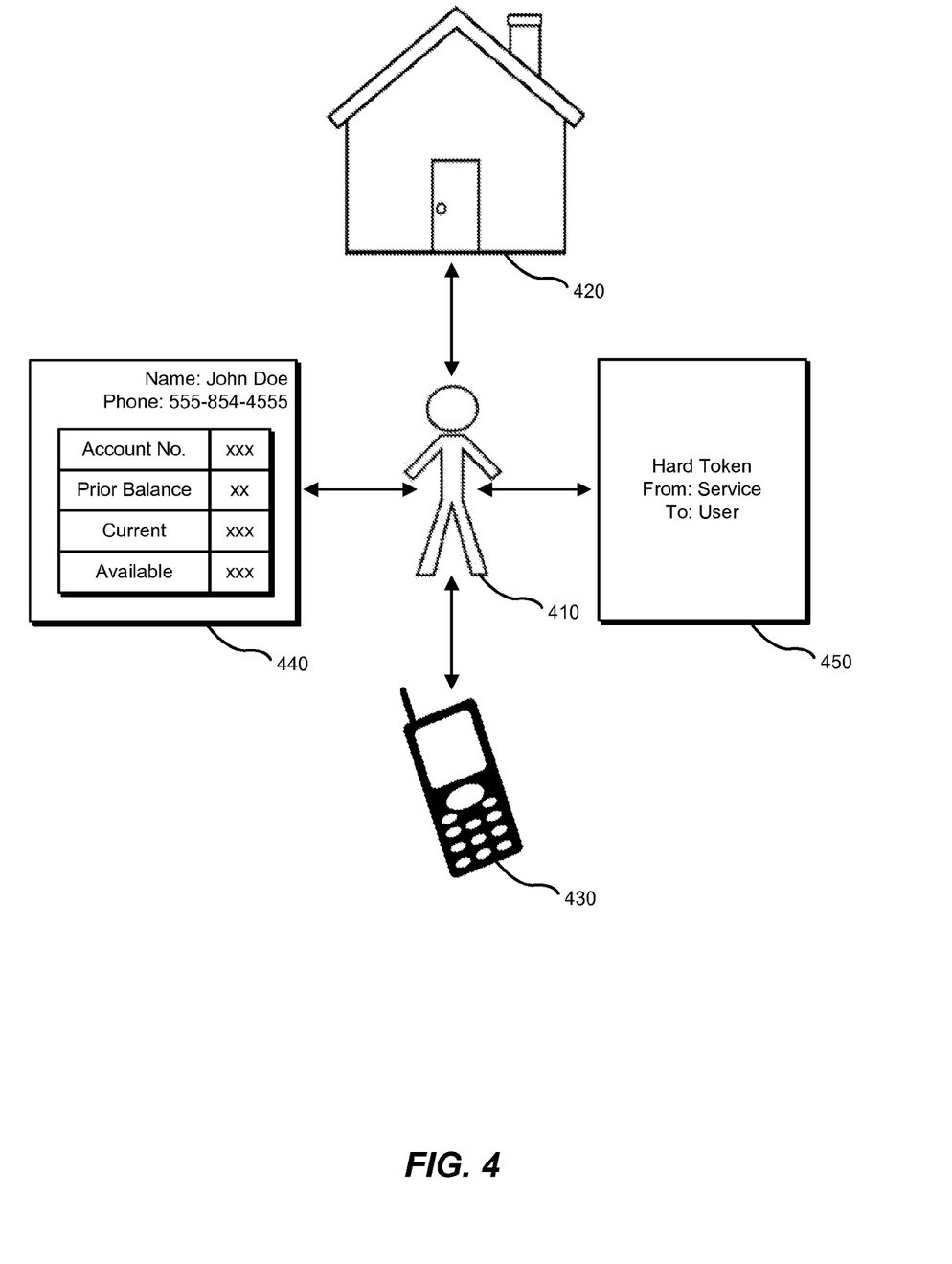
FIG. 4 is a block diagram that illustrates exemplary relationships between a user and various objects used in possession factor authentication.

Additionally or alternatively, a service may send a token to a user to be used as a possession factor credential. For example, a service may send a user, such as user 410, a hard token, such as a hard token 450, to be used for future authentication. In this example, the service may have designated the token or the user may have chosen the token from a list of potential possession factor credentials provided by the service. In some examples, the user may submit a location to which the service may send the hard token. In further examples, the service may subsequently authenticate the user by requesting the user to demonstrate that he or she possesses the hard token. For example, a bank may send a user a hard token in the form of a debit card. In this example, the user attempting to access an account through an Automated Teller Machine may be asked to demonstrate that he/she possesses the debit card by inserting the debit card into the Automated Teller Machine. In another example, a service may send a user a soft token, such as software or data that may be downloaded to a phone or computer, to an object designated by the user. For example, a user, such as user 410, may designate a phone, such as cellular phone 430 and, in response, a service may send a soft token to cellular phone 430 for download. In this example, the service may subsequently authenticate the user by requesting that he/she demonstrate that he/she possesses the soft token (e.g., data, a key, and/or a password).

Detection module 104 may detect a request from a user of a service to designate a new object in place of a previously designated object in a variety of ways. In some examples, detection module 104 may detect the request from the user by detecting that the user does not have access to the previously designated object. In these examples, the previously designated object may have been lost, misplaced, stolen, or destroyed. In some examples, the user may have moved and lost possession of the object through (or during) the moving process. In other examples, the previously designated object may have been lost without detection module 104 further detecting that the object was lost. Notably, in some examples, system 200 may base multifactor authentication on detecting ownership as distinct from mere possession.

In some examples, detection module 104 may operate as part of an online service that verifies that users possess previously designated objects as part of a login process. In these examples, detection module 104 may detect that a user attempting to log into an account is unable to demonstrate that he or she has access to the previously designated object. In some examples, the user may submit to the online service that he/she does not have access to the previously designated object and that he/she would like to designate a new object to be used as the possession factor credential in place of the previously designated object.

At step 304, one or more of the systems described herein may authenticate the user by (1) proofing the identity of the user to verify that an alleged identity of the user is the actual identity of the user and (2) verifying that the proofed identity of the user had possession of the previously designated object. For example, verification module 106 may, as part of server 206 in FIG. 2, authenticate user 410 in FIG. 4 by (1) proofing the identity of user 410 to verify that an alleged identity of user 410 is the actual identity of user 410 and (2) verifying that the proofed identity of user 410 had possession of the previously designated object, such as cellular phone 430 and/or hard token 450. Notably, although FIG. 3 shows that both (1) identity proofing and (2) verifying possession are part of step 304, each of these constitutes sub-steps that may be performed separately, performed by different modules (or by different sub-modules within verification module 106 or system 200), and/or performed using different methods and techniques. Moreover, these sub-steps, like all steps within method 300 (and associated sub-steps discussed throughout the specification), may be performed in any suitable or logical order.

As used herein, the phrase "authenticate" generally refers to any type or form of process, procedure, and/or event for verifying that a user is authorized to access and/or make changes to a user account. Verification module 106 may authenticate a user in a variety of ways. In some examples, verification module 106 may authenticate a user by proofing the identity of the user. As used herein, the phrase "proofing an identity" generally refers to a process for determining a real-world identity of an online user. In general, identity proofing may include determining whether an alleged identity of the user is the actual identity of the user. In these examples, the term "alleged identity of the user" generally refers to an identity alleged by the user at the time he/she set up an online account, such as user account 124, with a service.

Verification module 106 may proof an identity of a user in a variety of ways. In some examples, verification module 106 may submit, to a user, questions relating to the user's identity. In these examples, verification module 106 may proof the user's identity based on whether answers, provided by the user in response to receiving the questions, correspond to the actual identity of the user. In one embodiment, the user may have previously selected the questions and, at the time the user selected the questions, the user may have also submitted answers to the questions. In this embodiment, verification module 106 may proof the identity of the user if the answers provided in response to receiving the questions match the previously submitted answers. The questions may include questions that untrusted individuals would be unlikely to answer successfully, such as "who was your childhood best friend," or "what was the name of your first pet," or may request identifying information such as a birthday, social security number, etc. Additionally or alternatively, verification module 106 may have created the questions based on records such as the user's personal records or financial records. In this embodiment, verification module 106 may proof the user's identity if answers submitted by the user in response to receiving the questions match the information found in the user's personal records or financial records.

In some examples, verification module 106 may proof an identity of a user using physical identification validation. In these examples, verification module 106 may proof the identity by examining, without limitation, a driver's license of the user, a passport of the user, and/or any other physical identification card, token, or identifier (e.g., issued by a government or other authority). In some examples, verification module 106 may proof an identity of a user using address validation. In these examples, verification module 106 may proof the identity by mailing a code to an address of the user and verifying that the user can receive it. In some examples, verification module 106 may proof an identity of a user using financial record validation. In these examples, verification module 106 may charge a small amount to a credit card of the user and/or initiate a small deposit into a checking account of the user and test the user's knowledge of the charge and/or deposit.

In some examples, verification module 106 may authenticate a user by verifying that the proofed identity of the user had possession of the previously designated object. As used herein, the term "possession" generally refers to a user owning an object and/or having access to an object. Verification module 106 may verify that the proofed identity of the user had possession of the previously designated object in a variety of ways.

Figure 5:
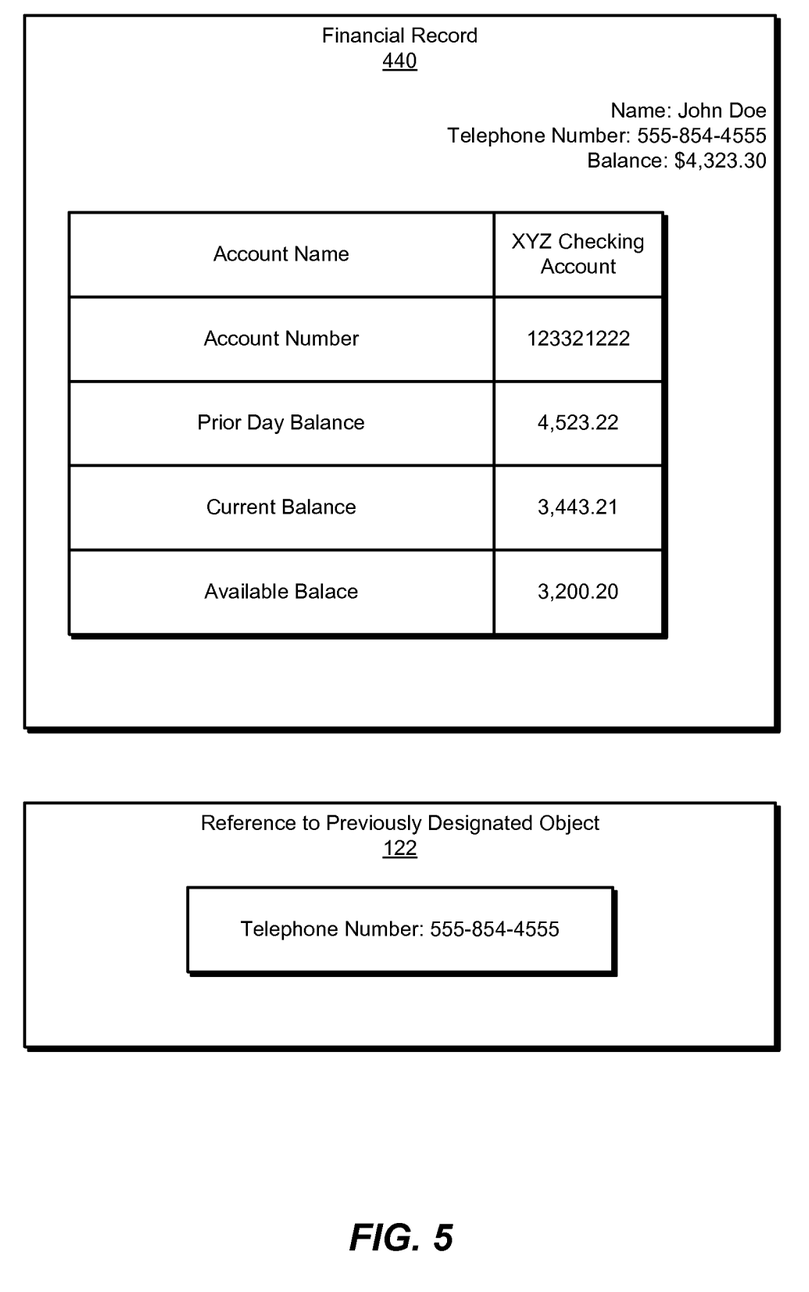
FIG. 5 is a block diagram of an exemplary previously designated object and an exemplary record used in possession factor authentication.

As discussed above at step 302, in some embodiments, the previously designated object may be an object that the user already possessed at the time the object was designated as the possession factor credential. In these embodiments, verification module 106 may verify that a proofed identity of a user had possession of a previously designated object by (1) retrieving a record associated with the proofed identity of the user and (2) identifying a reference in the record to the previously designated object. For example, as illustrated in FIG. 4, verification module 106 may determine that user 410 corresponds to a real-world individual named "John Doe" using identity proofing (as discussed above). Verification module 106 may also find reference to a previously designated object 122 in a database of the service requesting the authentication, such as database 120. As shown in FIG. 5, reference to previously designated object 122 may indicate that the previously designated object was a telephone with the telephone number 555-854-4555. Verification module 106 may then retrieve a financial record 440 that corresponds to the proofed identity named John Doe and identify a reference to John's Doe telephone number (i.e., 555-854-4555) in financial record 440. Based on the telephone number identified in financial record 440 matching the telephone number identified in reference to previously designated object 122, verification module 106 may conclude that John Doe had possession of the previously designated object (i.e., the telephone with the telephone number 555-854-4555).

Verification module 106 may retrieve a record associated with a proofed identity of a user in a variety of ways. In some examples, verification module 106 may query the user for the record. In other examples, verification module 106 may retrieve the record by searching publically available data. In other examples, verification module 106 may query a third party for the records. In some examples, verification module 106 may query an external identity verifier such as EXPERIAN or RELYID, etc. The record may be in the form of, without limitation, a credit report, a loan application, a phone directory, a provider record, a phone service record, a financial statement, and/or a tax return.

In addition, or as an alternative, to verifying possession using records, verification module 106 may (1) identify a third party associated with the proofed identity of the user and (2) query the third party for information relating to whether the user had possession of the previously designated object. The third party may be any party that would have information relating to whether the user had possession of the previously designated object, such as a bank, an external identity verifier, a credit card company, a phone service company, a government agency, etc.

In some embodiments, as discussed above at step 302, the previously designated object may be a token issued to a user by a service. In these embodiments, verification module 106 may verify that a proofed identity of a user had possession of a previously designated object by (1) identifying a physical location and/or object where the token was sent and (2) determining that the user had possession of the physical location and/or object where the token was sent (e.g., even if the user did not designate the physical location and/or object as a possession factor credential). For example, as illustrated in FIG. 4, verification module 106 may determine that user 410 corresponds to a real-world individual named "John Doe" using identity proofing (as discussed above). Verification module 106 may also determine that the service mailed hard token 450 to user 410 via a house 420. Verification module 106 may then retrieve a record, such as a loan application, that corresponds to John Doe and identifies house 420 as the residence of John Doe. Based on the residence in the record matching the location to which hard token 450 was mailed, verification module 106 may conclude that John Doe had possession of hard token 450. Similarly, verification module 106 may, after determining that user 410 corresponds to the real-world individual named "John Doe," identify a home address associated with an IP address used by the user to download a soft token from the service. Verification module 106 may then retrieve a record that corresponds to John Doe and identifies the same home address as the home address associated with the IP address. Based on the residence in the record matching the home address associated with the IP address, verification module 106 may conclude that John Doe had possession of the soft token.

In addition, or as an alternative, to verifying possession of a token using records, verification module 106 may (1) identify a third party associated with the proofed identity of the user and (2) query the third party for information relating to whether the user had possession of the physical location and/or object where the token was sent. The third party may be any party that would have information relating to whether the user had possession of the physical location and/or object where the token was sent, such as a bank, an external identity verifier, a credit card company, a phone service company, a government agency, etc.

At step 306, one or more of the systems described herein may, in response to verifying that the proofed identity of the user had possession of the previously designated object, designate the new object as the possession factor credential. For example, designation module 108 may, as part of server 206 in FIG. 2 and in response to verification module 106 verifying that the proofed identity of user 410 had possession of the previously designated object, designate new object 208 as the possession factor credential. Designation module 108 may designate the new object as the possession factor credential in a variety of ways. For example, designation module 108 may replace a reference to the previously designated object maintained by the service, such as reference to previously designated object 122, with a reference to the new object, such as a reference to new object 208.

In some examples, after designation module 108 has designated the new object as the possession factor credential, designation module 108 may allow the user to access and/or make changes to an account associated with the user if the user demonstrates that the user possesses the new object. For example, designation module 108 may, after designating new object 208, (1) identify an attempt by user 410 to log into and/or make changes to user account 124, (2) determine that user 410 has possession of new object 208, and (3) allow user 410 to log into and/or make changes to user account 124 based, at least in part, on determining that user 410 has possession of new object 208.

As discussed above, the systems and methods described here may enable a service to determine whether an attempt by a user to update a possession factor credential is legitimate (e.g., the identity of the user corresponds to the identity that initially created the account and is thereby authorized to access and make changes to the account) or fraudulent (e.g., the identity of the user does not correspond to the identity that initially created the account and is thereby unauthorized to access and make changes to the account). The disclosed systems and methods may thereby close a loophole that allowed users to update possession factor credentials using only a weak identity proofing mechanism, without the users also demonstrating possession of the previously-designated possession factor credential.

Figure 6:
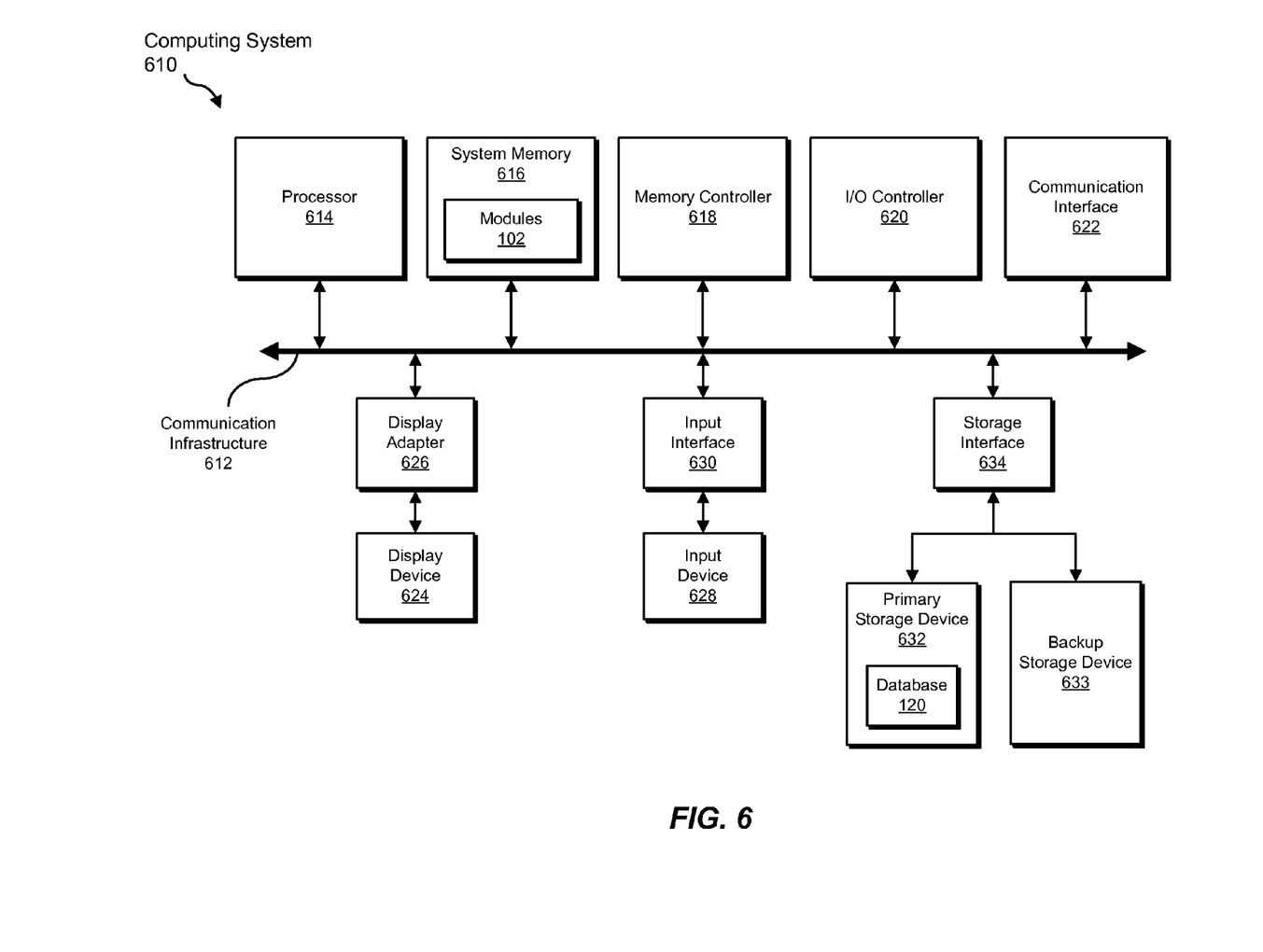
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
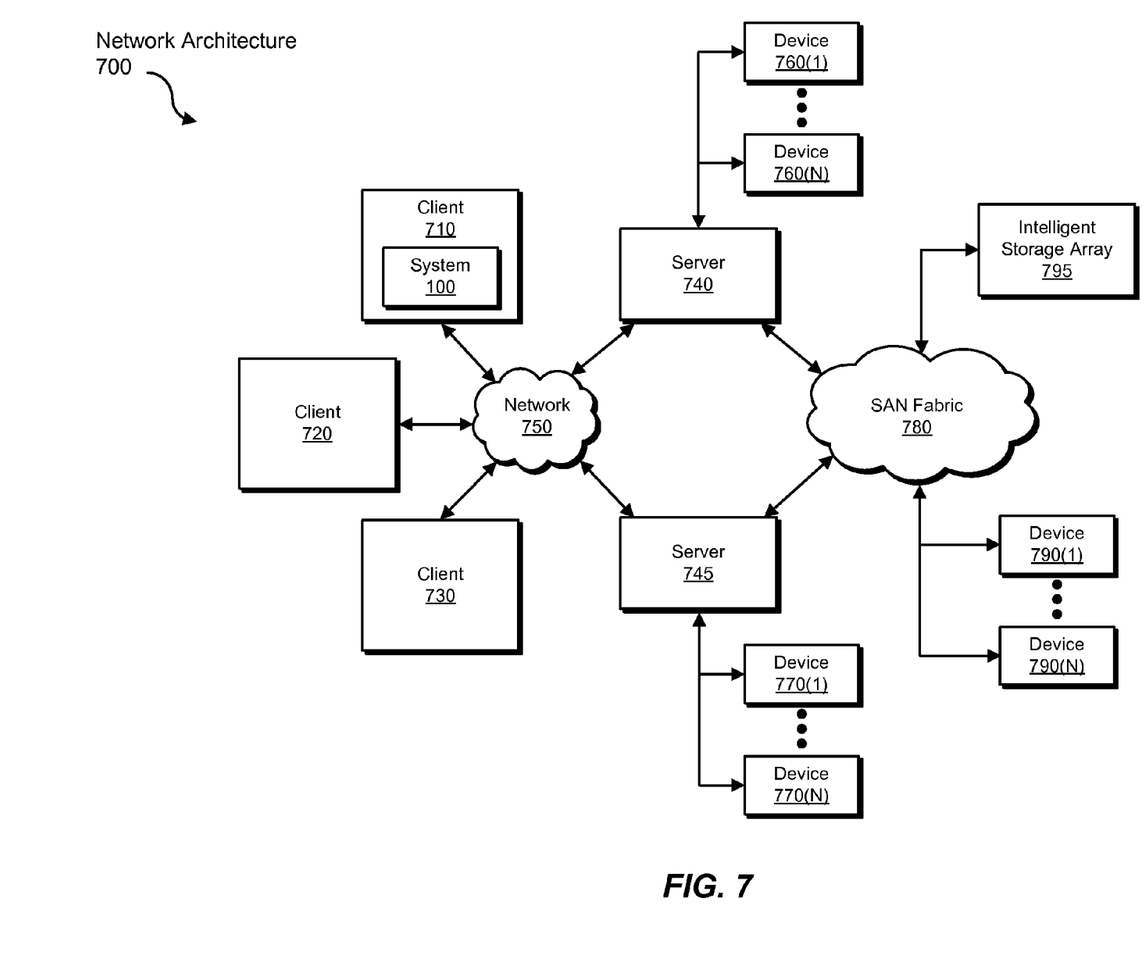
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for updating possession factor credentials.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information relating to an identity of a user and possessions of the user and transform the information into a determination used to determine whether to allow a possession factor designation update to occur. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for updating possession factor credentials, the method comprising:
    authenticating a user of a service by:
        sending a code to a designated phone number for an initial phone via at least one of a SHORT MESSAGE SERVICE message and an automated voice call;
        receiving from the initial phone, in response to the sending the code to the user,
    a message comprising the code to demonstrate possession by the user of the initial phone;
    detecting a request from the user of the service to designate a new object to be used by the service as a possession factor credential in place of a previously designated object, the new object comprising a new phone and the previously designated object comprising the initial phone;
    prior to allowing the user to designate the new object, authenticating the user by:
        proofing identity of the user to verify that an alleged identity of the user is the actual identity of the user;
        verifying that the proofed identity of the user had possession of the previously designated object by identifying a reference in a third party record to the designated phone number for the initial phone previously designated as the possession factor credential;
    in response to the verifying that the proofed identity of the user had possession of the previously designated object, designating the new object as the possession factor credential;
    wherein the method is performed by a computing device comprising at least one processor.

2. The computer-implemented method of claim 1, wherein the detecting the request from the user to designate the new object comprises detecting that the user does not have access to the previously designated object.

3. The computer-implemented method of claim 1, wherein the proofing the identity of the user comprises submitting, to the user, questions relating to the identity of the user.

4. The computer-implemented method of claim 3, wherein the proofing the identity of the user comprises determining that answers provided by the user, in response to the questions, correspond to the actual identity.

5. The computer-implemented method of claim 4, wherein the user previously selected the questions and, at the time the user selected the questions, the user also submitted answers to the questions.

6. The computer-implemented method of claim 5, wherein the proofing the identity of the user comprises determining whether the answers provided in response to receiving the questions match the previously submitted answers.

7. The computer-implemented method of claim 1, wherein the previously designated object comprises an object that the user already possessed at the time the object was designated as the possession factor credential.

8. The computer-implemented method of claim 7, wherein the verifying that the proofed identity of the user had possession of the previously designated object comprises retrieving the third party record.

9. The computer-implemented method of claim 8, wherein the third party record comprises at least one of:
    a credit report;
    a tax return;
    a loan application;
    a phone directory.

10. The computer-implemented method of claim 7, wherein the verifying that the proofed identity of the user had possession of the previously designated object comprises:
    identifying a third party associated with the user;
    querying the third party for information relating to whether the user had possession of the previously designated object.

11. The computer-implemented method of claim 1, further comprising receiving, by the service, an indication from the user that the user does not have access to the previously designated object.

12. The computer-implemented method of claim 1, wherein the proofing the identity of the user comprises at least one of:
    physical identification validation;
    address validation;
    financial record validation.

13. The computer-implemented method of claim 1, further comprising:
    identifying an attempt by the user to log into a user account provided by the service;
    determining that the user has possession of the new object;
    allowing the user to log into the user account provided by the service based, at least in part, on determining that the user has possession of the new object.

14. A system for updating possession factor credentials, the system comprising:

a verification module, stored in a memory of a server, that authenticates a user of a service by:
sending a code to a designated phone number for an initial phone via at least one of a SHORT MESSAGE SERVICE message and an automated voice call;
receiving from the initial phone, in response to the sending the code to the user,
a message comprising the code to demonstrate possession by the user of the initial phone;
a detection module, stored in the memory of the server, that detects a request from the user of the service to designate a new object to be used by the service as a possession factor credential in place of a previously designated object, the new object comprising a new phone and the previously designated object comprising the initial phone;
wherein the verification module, prior to allowing the user to designate the new object, further authenticates the user by:
proofing identity of the user to verify that an alleged identity of the user is the actual identity of the user;
verifying that the proofed identity of the user had possession of the previously designated object by identifying a reference in a third party record to the designated phone number for the initial phone previously designated as the possession factor credential;
a designation module, stored in the memory of the server, that, in response to the verification module verifying that the proofed identity of the user had possession of the previously designated object, designates the new object as the possession factor credential;
at least one physical processor configured to execute the detection module, the verification module, and the designation module.

15. The system of claim 14, wherein the detection module detects the request from the user to designate the new object by detecting that the user does not have access to the previously designated object.

16. The system of claim 14, wherein the verification module proofs the identity of the user by submitting, to the user, questions relating to the identity of the user.

17. The system of claim 16, wherein the verification module proofs the identity of the user by determining that answers provided by the user, in response to the questions, correspond to the actual identity.

18. The system of claim 14, wherein the previously designated object comprises an object that the user already possessed at the time the object was designated as the possession factor credential.

19. The system of claim 18, wherein the verification module retrieves the third party record.

20. A non-transitory computer-readable medium comprising one or more computer-readable instructions that, when executed by at least one processor of a server, cause the server to:
authenticate a user of a service by:
sending a code to a designated phone number for an initial phone via at least one of a SHORT MESSAGE SERVICE message and an automated voice call;
receiving from the initial phone, in response to the sending the code to the user,
a message comprising the code to demonstrate possession by the user of the initial phone;
detect a request from the user of the service to designate a new object to be used by the service as a possession factor credential in place of a previously designated object, the new object comprising a new phone and the previously designated object comprising the initial phone;
prior to allowing the user to designate the new object, authenticate the user by:
proofing identity of the user to verify that an alleged identity of the user is the actual identity of the user;
verifying that the proofed identity of the user had possession of the previously designated object by identifying a reference in a third party record to the designated phone number for the initial phone previously designated as the possession factor credential;
in response to the verifying that the proofed identity of the user had possession of the previously designated object, designate the new object as the possession factor credential.

* * * * *